(12) United States Patent
Yuhara et al.

(10) Patent No.: US 9,145,990 B2
(45) Date of Patent: Sep. 29, 2015

(54) FLUID COUPLING

(75) Inventors: Koichi Yuhara, Osaka (JP); Izuru Shikata, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 215 days.

(21) Appl. No.: 13/806,390

(22) PCT Filed: Jun. 13, 2011

(86) PCT No.: PCT/JP2011/063465
§ 371 (c)(1),
(2), (4) Date: Mar. 6, 2013

(87) PCT Pub. No.: WO2012/017740
PCT Pub. Date: Feb. 9, 2012

(65) Prior Publication Data
US 2013/0154253 A1    Jun. 20, 2013

(30) Foreign Application Priority Data
Aug. 2, 2010   (JP) .................. 2010-173252

(51) Int. Cl.
| F16L 17/00 | (2006.01) |
| F16L 15/04 | (2006.01) |
| F16L 19/02 | (2006.01) |
| F16L 19/025 | (2006.01) |

(52) U.S. Cl.
CPC .............. *F16L 15/04* (2013.01); *F16L 19/025* (2013.01); *F16L 19/0218* (2013.01); *F16L 2201/10* (2013.01)

(58) Field of Classification Search
USPC ............................................ 285/14, 354, 379
See application file for complete search history.

(56) References Cited

U.S. PATENT DOCUMENTS

| 5,566,983 | A | * | 10/1996 | Gluys et al. ...................... 285/14 |
| 5,996,636 | A | * | 12/1999 | Fukano et al. ................. 285/354 |
| 6,039,319 | A | * | 3/2000 | Coonce et al. |
| 6,170,890 | B1 | * | 1/2001 | Ohmi et al. ................... 285/379 |
| 6,431,608 | B1 | * | 8/2002 | Kato ............................... 285/13 |

FOREIGN PATENT DOCUMENTS

JP    3876351 A    1/1999

* cited by examiner

*Primary Examiner* — Gregory Binda
(74) *Attorney, Agent, or Firm* — Locke Lord LLP

(57) ABSTRACT

A fluid coupling reliably finding absence of the gasket, if exists, in the leak test is provided. Butted end surfaces of coupling members have annular sealing protrusions and anti-overfastening annular protrusions protruded further than the annular sealing protrusions, respectively. At least one of the anti-overfastening annular protrusions has a communication path communicating internal space with external space when both the anti-overfastening annular protrusions butt against each other.

4 Claims, 4 Drawing Sheets

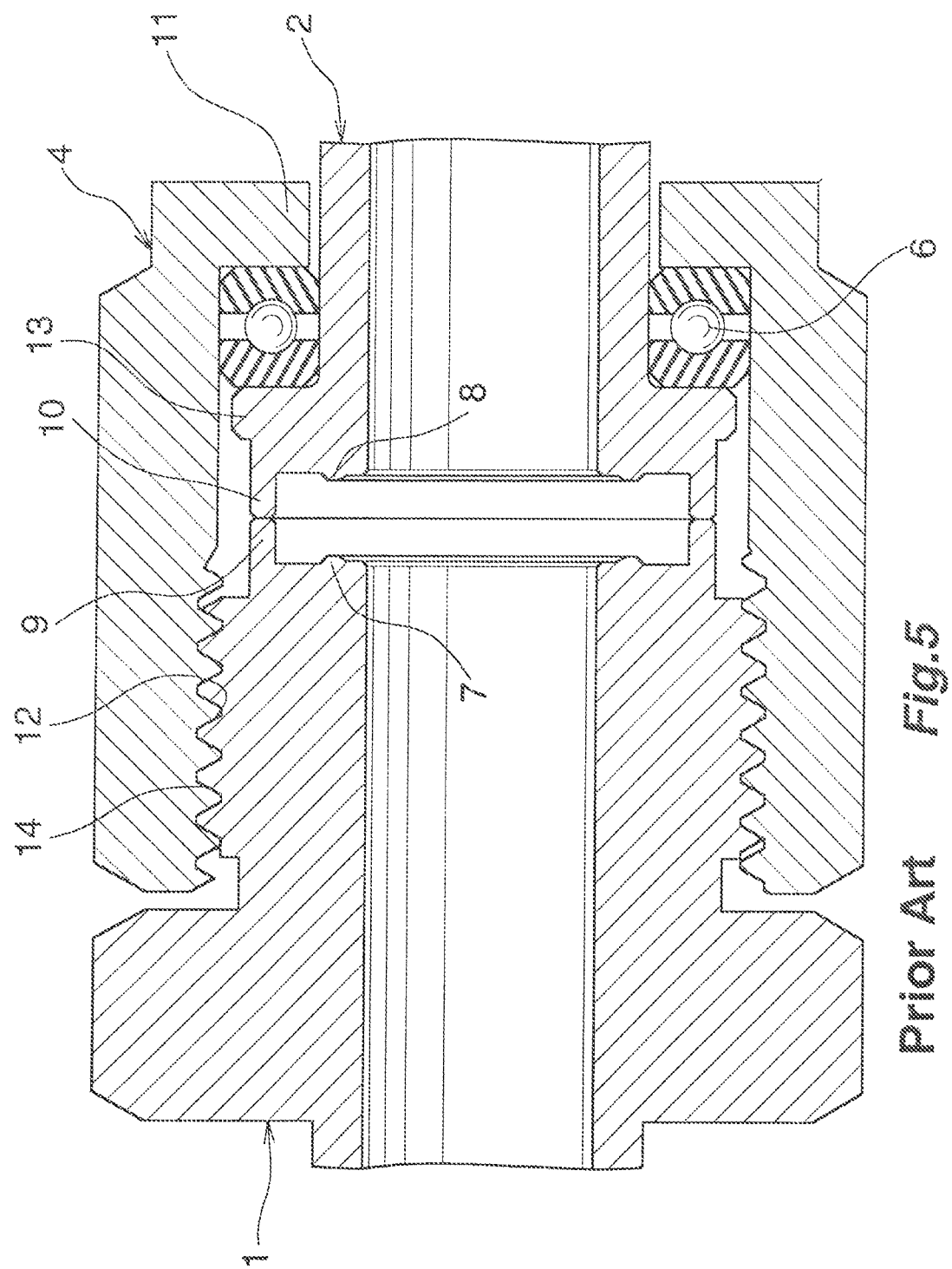
Prior Art  Fig.5

FLUID COUPLING

TECHNICAL FIELD

The present invention relates to a fluid coupling, and in particular, to a fluid coupling provided with a anti-overfastening annular protrusion for preventing fastening exceeding proper fastening.

BACKGROUND ART

A conventional fluid coupling includes first and second coupling members having respective fluid paths communicating with each other, an annular gasket interposed between butted end surfaces of both the coupling members, and a screw means that couples the coupling members to each other, and the butted end surface of each coupling member has an annular sealing protrusion and an anti-overfastening annular protrusion protruded further than the sealing protrusion (for example, Patent Document 1).

In the fluid coupling, the annular sealing protrusions come into contact with the gasket to deform the gasket, thereby obtaining required sealing property, and the anti-overfastening annular protrusions prevent fastening exceeding proper fastening. At proper fastening, the anti-overfastening annular protrusion of one coupling member is opposed to the anti-overfastening annular protrusion of the other coupling member via a retainer or not via the retainer, and the anti-overfastening annular protrusions do not exert any force to each other or do not exert a substantial force to each other. To prevent overfastening, at further fastening, the anti-overfastening annular protrusion of one coupling member and the anti-overfastening annular protrusion of the other coupling member butt against each other via the retainer or directly, increasing a resistance to fastening, thereby preventing excessive fastening.

PRIOR ART DOCUMENT

Patent Document

Patent Document 1: U.S. Pat. No. 3,876,351

SUMMARY OF THE INVENTION

Problems to be Solved by the Invention

In the above-mentioned fluid coupling, in the case of forgetting to provide the gasket, the anti-overfastening annular protrusion of one coupling member directly butts against the anti-overfastening annular protrusion of the other coupling member. When a leak test is made in this state, butting between the anti-overfastening annular protrusion of one coupling member and the anti-overfastening annular protrusion of the other coupling member achieves the sealing property and therefore, in spite of absence of the gasket, the fluid coupling may disadvantageously pass the leak test.

An object of the present invention is to provide a fluid coupling capable of reliably finding absence of the gasket, if exists, in the leak test.

Means for Solving the Problems

A fluid coupling according to the present invention includes first and second coupling members including respective fluid paths communicating with each other, an annular gasket interposed between butted end surfaces of both the coupling members, and a screw means that couples the coupling members to each other, the butted end surface of each coupling member having an annular sealing protrusion and an anti-overfastening annular protrusion protruded further than the sealing protrusion, and at least one of the anti-overfastening annular protrusions has a communication path that communicates an internal space with an external space when both the anti-overfastening annular protrusions butt against each other.

The communication path may be formed of a communication groove provided in a front end surface of the anti-overfastening annular protrusion, and the communication path may be formed of a through hole passing through the anti-overfastening annular protrusion in a radial direction.

The communication groove has a semicircular, V-like, or rectangular cross section, and extends from an inner diameter to an outer diameter of the front end surface of the anti-overfastening annular protrusion. The communication path may be formed of a through hole having a circular cross section. In any case, the communication path is provided so as to communicate the internal space with the external space when both the anti-overfastening annular protrusions butt against each other. The internal space refers to a space in which the gasket is arranged, and the external space refers to an inner space of a nut coupling the coupling members to each other. In this case, by forming a test hole for leak test in the nut, absence of the gasket can be reliably found in the leak test. The number of communication paths is at least one and as a matter of course, may be plural.

Since the anti-overfastening annular protrusion does not contribute to the sealing property, the communication path formed in the anti-overfastening annular protrusion does not have a negative effect on the sealing property.

The screw means can be variously configured. For example, either the first coupling member or the second coupling member may have a male screw, and both the coupling members may be coupled to each other with a nut screwed into the male screw of the coupling member. Alternatively, both the first and second coupling members may be sleeve coupling members having no male screw, and both the coupling members may be coupled to each other with a male member as a separate member and a nut. One coupling member may have bolt insertion holes, the other coupling member may have female screws, and both the coupling members may be coupled to each other with bolts.

Effects of the Invention

In the fluid coupling according to the present invention, since at least one of the anti-overfastening annular protrusions is provided with the communication path that communicates the internal space with the external space when both the anti-overfastening annular protrusions butt against each other, in the case of absence of the gasket, leak through the communication path of the anti-overfastening annular protrusion occurs, resulting in that the absence of the gasket can be reliably found in the leak test.

BRIEF DESCRIPTION OF THE DRAWINGS

FIG. 5 is a vertical sectional view showing a main portion of a conventional coupling in the case of absence of a gasket.

Figure 1:
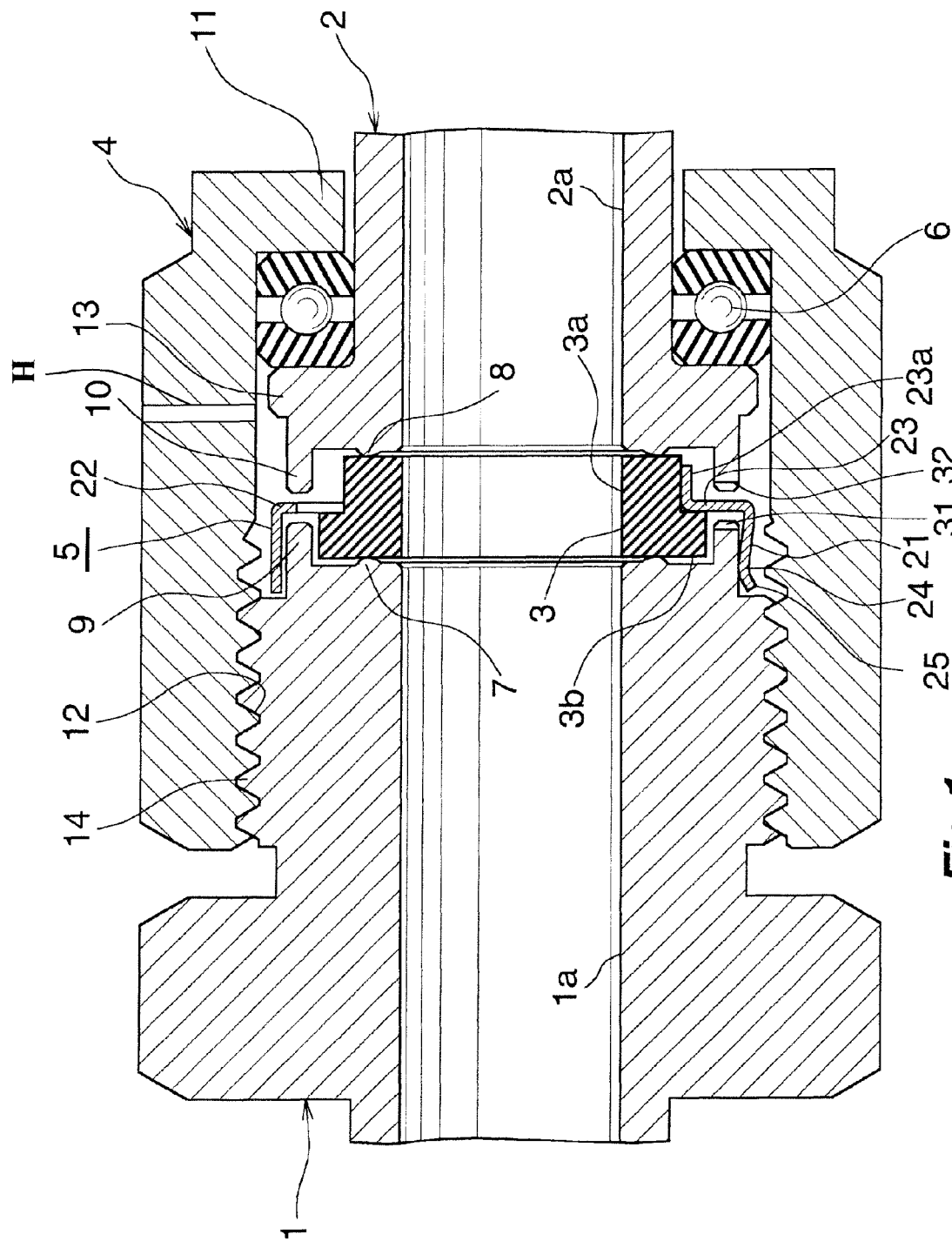
FIG. 1 is a vertical sectional view showing one embodiment of a fluid coupling according to the present invention.

DESCRIPTION OF REFERENCE NUMERALS (1)(2): coupling member
(3): gasket
(4): nut
(7)(8): sealing protrusion
(9)(10): anti-overfastening protrusion
(31) (32): communication groove (communication path)
(33): through hole (communication path)

MODES FOR CARRYING OUT THE INVENTION

An embodiment of the present invention will be described below with reference to drawings. In the following description, an upper side and a lower side mean an upper side and a lower side in the drawings.

FIG. 1 shows one embodiment of a fluid coupling according to the present invention, and the fluid coupling includes a tubular first coupling member (1) and a tubular second coupling member (2) having respective fluid paths communicating with each other, an annular gasket (3) interposed between a right end surface of the first coupling member (1) and a left end surface of the second coupling member (2), and a retainer (5) that holds the annular gasket (3) and is held by the first coupling member (1), and the second coupling member (2) is fixed to the first coupling member (1) by means of a nut (4) screwed into the first coupling member (1) from the second coupling member (2). Annular sealing protrusions (7), (8) are formed at substantially radial center of butted end surfaces of the coupling members (1), (2), respectively, and anti-overfastening annular protrusions (9), (10) are formed on outer circumferences of the coupling members (1), (2), respectively.

Both end surfaces of the gasket (3) are flat surfaces perpendicular to the axial direction. An anti-slip-off portion (3b) formed of an outward-directed flange is provided on the outer circumference of the gasket (3) and thus, the gasket (3) can be easily held by the retainer (5) and the retainer (5) can be easily held by the coupling members (1), (2).

Both the coupling members (1), (2) and the gasket (3) are made of SUS316L. An inner diameter of both the coupling members (1), (2) is equal to an inner diameter of the gasket (3). Stainless steel other than SUS316L and other metals are appropriately adopted for materials for both of the coupling members (1), (2) and the gasket (3).

The retainer (5) is integrally formed of a stainless steel plate, and includes an annular portion (21), a gasket holding portion (22) that has three claws (23) provided at a right end of the annular portion (21) so as to inwardly protrude and holds the outer circumference of the gasket (3), and a coupling member holding portion (24) engaged with the right end surface of the first coupling member (1). The three claws (23) have elasticity to some extent, and a bent portion (23a) that is bent to the right and has some elasticity is provided at a front end of each of the claws (23). The gasket (3) is fitted into each of the claws (23), and the bent portion (23a) is brought in close contact with the gasket (3), thereby preventing movement of the gasket (3) in the retainer (5) in the radial and axial directions. A pair of axial notches is provided at each of the positions where the three claws (23) are provided in the annular portion (21) and thus, three claw-like holding portions (25) constitute the coupling member holding portion (24). The three claw-like holding portions (25) sandwich an outer surface of a right end of the first coupling member (1) due to an elastic force to hold the retainer (5) in the first coupling member (1).

An inwardly-oriented flange (11) is formed at a right end of the nut (4), and the flange (11) is fitted to the circumference of the second coupling member (2). A female screw (12) is formed on an inner circumference of a left end of the nut (4), and is screwed into a male screw (14) formed on the right side of the first coupling member (1). An outwardly-oriented flange (13) is formed on an outer circumference of a left end of the second coupling member (2), and a thrust ball bearing (6) for preventing simultaneous rotation is interposed between the outwardly-oriented flange (13) and the inwardly-oriented flange (11) of the nut (4).

The anti-overfastening annular protrusions (9), (10) protrude further than the sealing protrusions (7), (8), respectively, toward the gasket (3) in the lateral direction, and when performing fastening exceeding proper fastening, press the retainer (5) from both surfaces of the retainer (5). The anti-overfastening annular protrusions (9), (10) protect the sealing protrusions (7), (8) of the coupling members (1), (2) before assembling, respectively, thereby preventing damage of the sealing protrusions (7), (8) that exerts a significant effect on the sealing property.

When the nut (4) is further fastened from the manually-fastened state by means of a wrench or the like, the gasket (3) is deformed, and at proper fastening, inner circumferences (1a), (2a) of the coupling members (1), (2) are substantially flush with an inner circumference (3a) of the gasket (3). That is, a recess that serves as a liquid chamber is not present. Then, when the nut is still further fastened, a gap between the anti-overfastening annular protrusions (9), (10) and the retainer (5) becomes 0, increasing a resistance to fastening to prevent overfastening.

In the fluid coupling, a test hole (H) for leak test is formed in the nut (4). The leak test for finding a defective piece in sealing, such as absence of the gasket, is made.

In the case of forgetting to provide the gasket (3), given that the nut is fastened until a fastening force reaches a predetermined fastening force, in the conventional fluid coupling, as shown in FIG. 5, the anti-overfastening annular protrusion (9) of the first coupling member (1) directly butts against the anti-overfastening annular protrusion (10) of the second coupling member (2), increasing the resistance to fastening. When the nut is further fastened, the fastening force reaches the predetermined fastening force (having the same magnitude as a proper fastening force). When the leak test is made for the fluid coupling in the state shown in FIG. 5, a certain degree of the sealing property can be obtained due to butting between the anti-overfastening annular protrusion (9) of the first coupling member (1) and the anti-overfastening annular protrusion (10) of the second coupling member (2) and therefore, even in the case where the gasket (3) is not provided, the fluid coupling can pass the leak test.

It is need to prevent such fluid coupling having no gasket from passing the leak test. Thus, in the fluid coupling according to the present invention, at least one of the anti-overfastening annular protrusions (9), (10) has communication grooves (communication paths) (31), (32) (both are shown) communicating an internal space (Si) with an external space (So) when both the anti-overfastening annular protrusions (9), (10) butt against each other.

Figure 2:
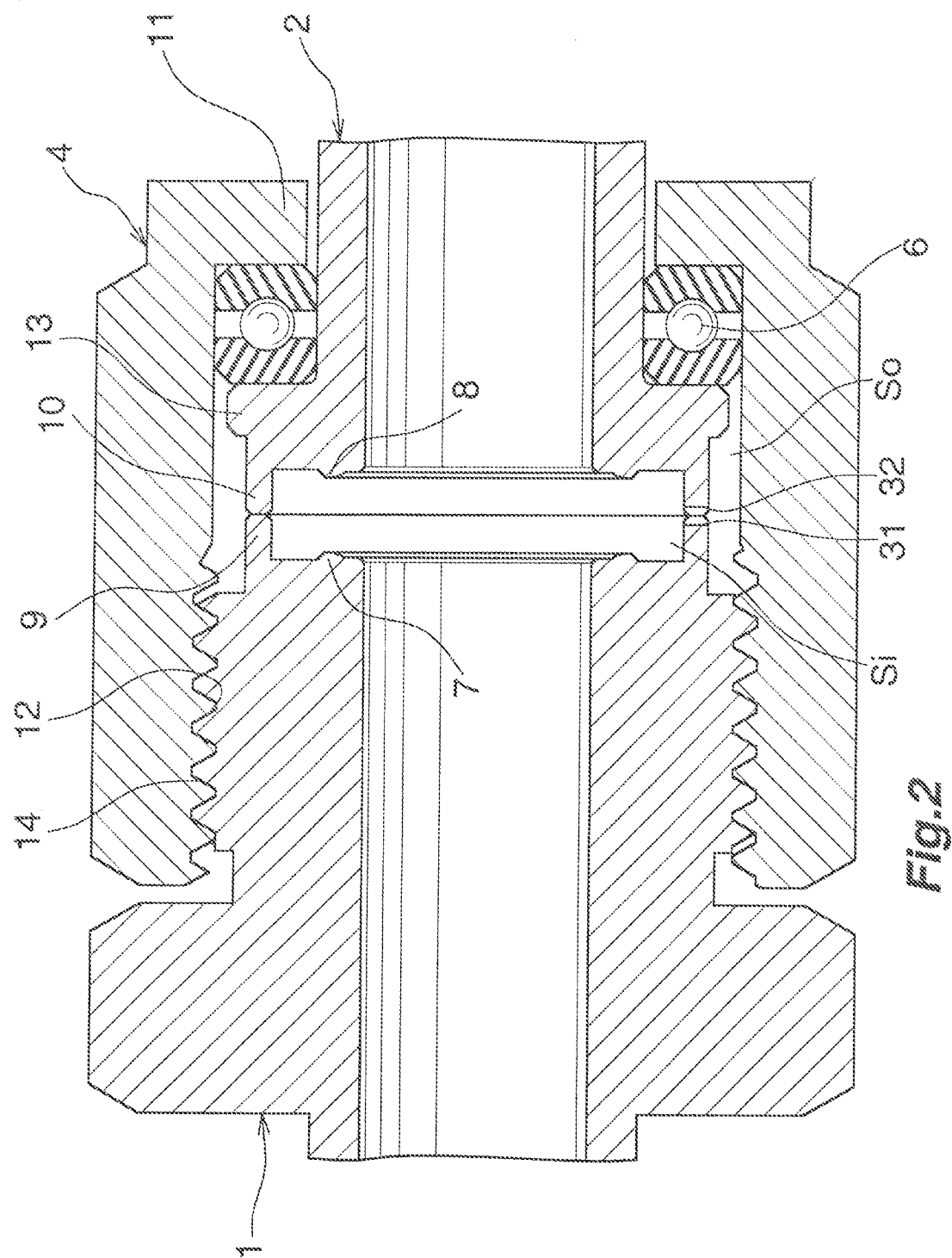
FIG. 2 is a vertical sectional view showing a main portion in the case of absence of a gasket.

In FIG. 2, when both the anti-overfastening annular protrusions (9), (10) butt against each other in the case of absence of the gasket (3), the internal space (Si) and the external space (So) of butted portions of both the anti-overfastening annular protrusions (9), (10) communicate with each other with the communication grooves (31), (32), and leak can be reliably found in the leak test.

Figure 3:
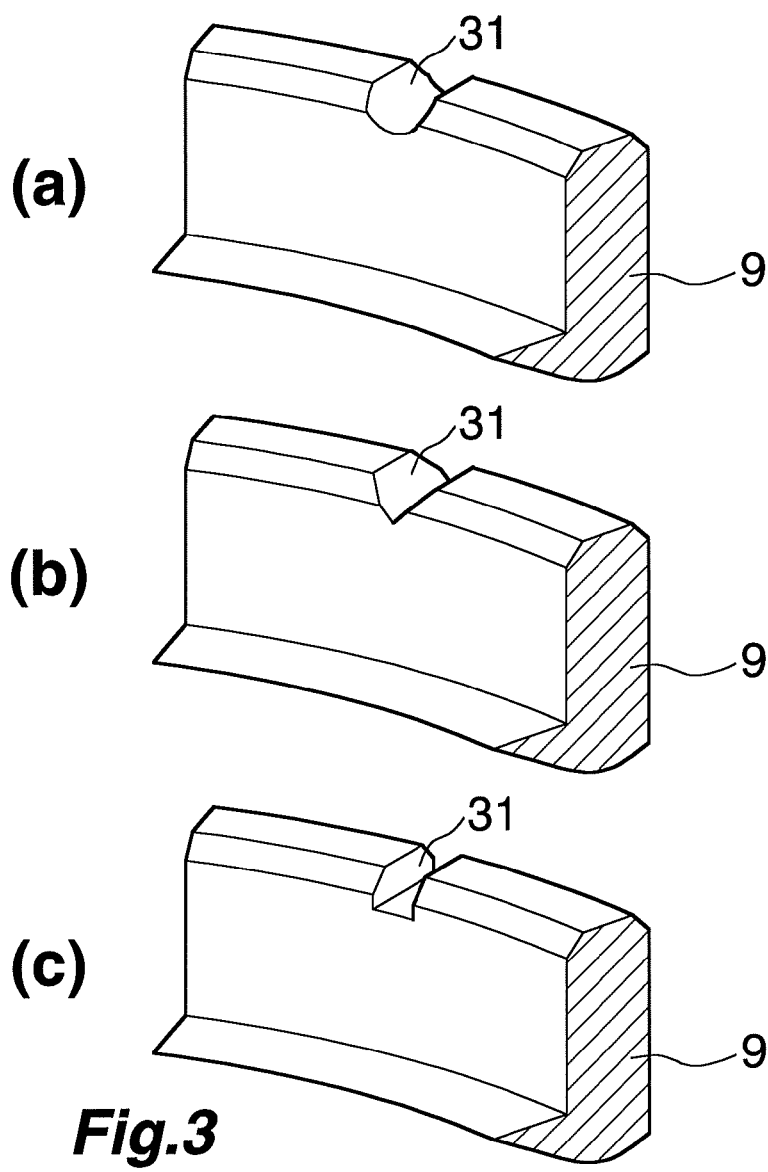
FIG. 3 is a perspective view showing an example of a communication path provided in an anti-overfastening annular protrusion.
Figure 4:
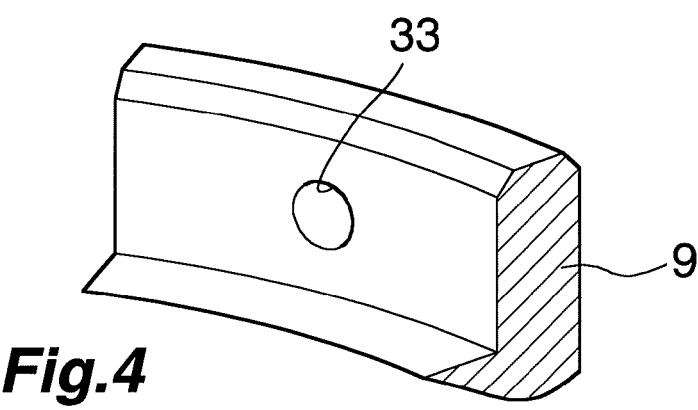
FIG. 4 is a perspective view showing another example of the communication path provided in the anti-overfastening annular protrusion.

The communication groove (31) may be shaped to have a semicircular cross section as shown in FIG. 3(a), to have a V-like cross section as shown in FIG. 3(b), or to have a rectangular cross section as shown in FIG. 3(c) (this also applies to (32)). As shown in FIG. 4, the communication grooves (31), (32) may be replaced with a through hole (communication path) (33) that passes through the anti-overfastening annular protrusion (9) in the radial direction and has a circular cross section. In any shape, absence of the gasket (3), if exists, can be reliably found in the leak test.

The number of communication paths (31),(32), (33) is at least one and as a matter of course, may be plural. The communication paths (31), (32), (33) only need to be provided in the anti-overfastening annular protrusion (9) or (10) of either coupling member (1) or (2). In the case where the communication grooves (31), (32) are provided in the anti-overfastening annular protrusions (9), (10) of both the coupling members (1), (2), there is no need to position the protrusions at butting.

INDUSTRIAL APPLICABILITY

According to the present invention, absence of the gasket, if exists, in the fluid coupling can be reliably found in the leak test, contributing to improvement of the reliability of the fluid coupling.

The invention claimed is:
1. A fluid coupling comprising:
first and second coupling members including respective fluid paths communicating with each other;
a metal annular gasket interposed between butted end surfaces of both the coupling members; and
a screw means that couples the coupling members to each other, the butted end surface of each coupling member having an annular sealing protrusion and an anti-overfastening annular protrusion protruded further than the sealing protrusion,
wherein at least one of the anti-overfastening annular protrusions has a communication path that communicates an internal space of the anti-ovetfastening annular protrusions in which the gasket is arranged with an external space of the anti-ovetfastening annular protrusions which is an inner space of a nut coupling the coupling members to each other when both the anti-overfastening annular protrusions butt against each other, wherein a test hole for leak test is formed in the nut.
2. The fluid coupling according to claim 1, wherein the communication path is formed of a communication groove provided in a front end surface of the anti-overfastening annular protrusion.
3. The fluid coupling according to claim 2, wherein the communication groove is semicircular, V-shaped, or rectangular in a cross section.
4. The fluid coupling according to claim 1, wherein the communication path is formed of a through hole passing through the anti-overfastening annular protrusion in a radial direction.

* * * * *